May 26, 1959 — J. E. WALDRUM — 2,888,206
SPRAYING APPARATUS

Filed Dec. 3, 1957 — 2 Sheets-Sheet 1

INVENTOR.
JOHN E. WALDRUM
BY
Caesar and Rivise
ATTORNEYS.

May 26, 1959 J. E. WALDRUM 2,888,206
SPRAYING APPARATUS
Filed Dec. 3, 1957 2 Sheets-Sheet 2

INVENTOR.
JOHN E. WALDRUM
BY
Caesar and Rivise
ATTORNEYS.

United States Patent Office 2,888,206
Patented May 26, 1959

2,888,206
SPRAYING APPARATUS

John E. Waldrum, Ambler, Pa., assignor to Amchem Products, Inc., Ambler, Pa., a corporation of Delaware Application December 3, 1957, Serial No. 700,333

5 Claims. (Cl. 239—215)

This invention relates to a liquid spraying device especially adapted for spraying agricultural emulsions, such as herbicidal compositions, on fields, railroad right of ways, etc.

Heretofore, conventional apparatus for spraying agricultural emulsions caused them to increase in viscosity and even to invert because of the mechanical working which said apparatus performed on the emulsions.

It is the primary object of the invention to provide a spray device which substantially eliminates mechanical work from being performed on the emulsions thereby keeping their characteristics intact throughout the spraying operation.

Another object is to provide a spray device in which a rotatable disk is driven in unison with a mechanical conveyor whereby fluid is transmitted to the disk and sprayed therefrom thereby eliminating almost entirely shearing action of the fluid.

Another object is to provide a spray device of the character described in which a means is provided to cut off fluid feed to the disk when the disk is not positively driven.

These and other objects will become more apparent as the following description proceeds in conjunction with the accompanying drawing, wherein:

Fig. 5 is a fragmentary sectional view of another form of disk.

Fig. 6 is a view similar to Fig. 5 showing still another form of disk; and

Fig. 7 is a view similar to Fig. 5 showing yet another form of disk.

Specific reference is now made to the drawings wherein similar reference characters are used for corresponding elements throughout.

Figure 1:
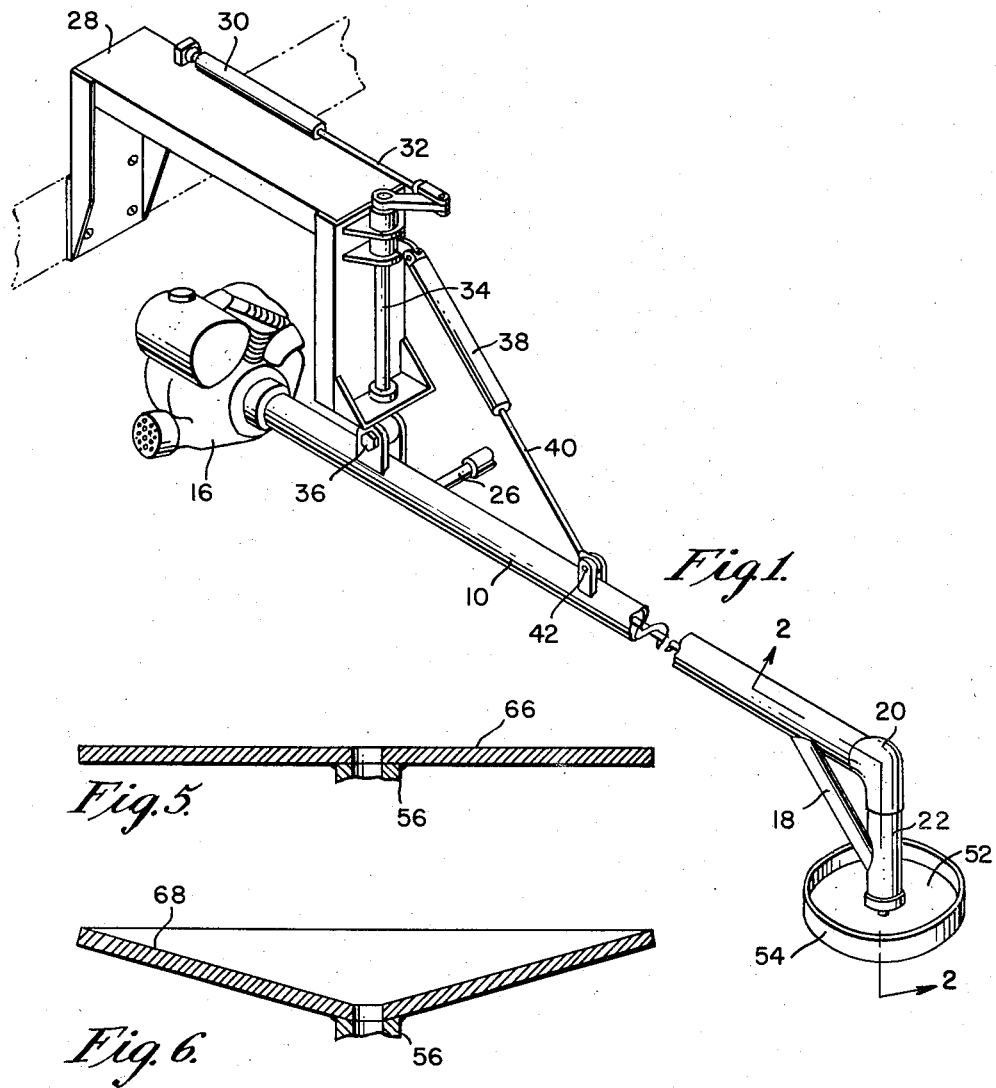
Fig. 1 is a perspective view of the device.
Figure 2:
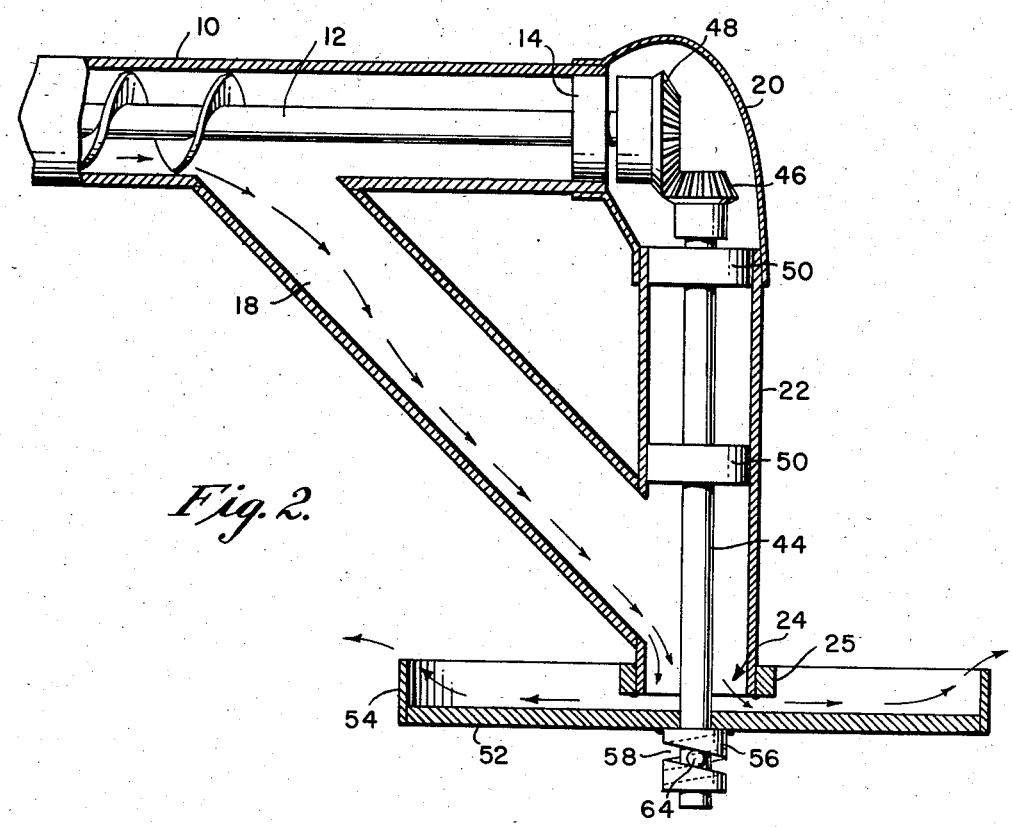
Fig. 2 is an enlarged longitudinal sectional view through the discharge end of the device taken on the line 2—2 of Fig. 1.
Figures 3, 4:
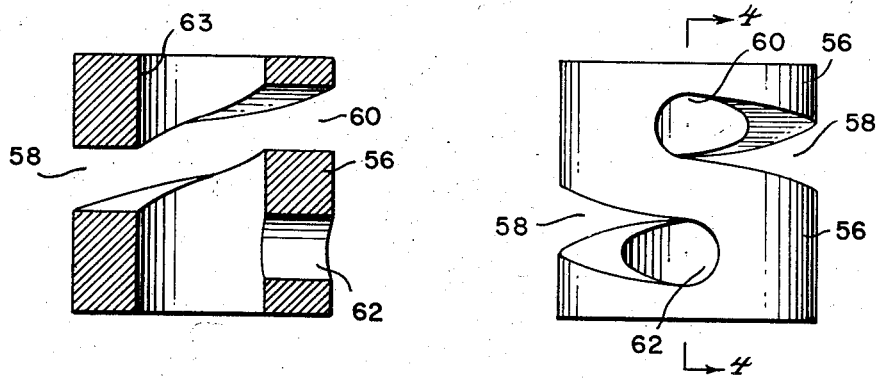
Fig. 3 is an enlarged elevational view of the means mounting the disk on the spindle as shown in Fig. 2.
Fig. 4 is a section taken on the line 4—4 of Fig. 3.

Indicated at 10 is an elongated pipe or boom through which extends a screw conveyor 12 which is journaled in suitable thrust bearings, such as 14. Mounted at one end of the boom and operatively connected to the conveyor is an internal combustion engine 16.

Adjacent its other end, the boom is communicative with an angulated fluid discharge conduit 18. Said other end of the boom carries a fitting 20 which mounts a generally vertical pipe section 22, the latter joining the branch conduit 18 at its lower end there to form a fluid outlet opening 24 about which is secured a ring 25.

The boom is adapted to be mounted upon a suitable vehicle, such as a truck, which carries a fluid supply container (not shown) whose outlet 26 is communicated with the boom at a suitable point preferably adjacent the power source 16. The boom may be mounted upon the vehicle by means of a bracket 28. The bracket mounts a generally horizontal hydraulic cylinder 30, the piston rod 32 of which is connected by suitable linkage to a rotatable vertical rod 34 which is pivoted as at 36 to ears on the boom. Actuation of the piston rod 32 will move the boom in a horizontal plane. Another hydraulic cylinder 38 is connected to the bracket 28, the piston rod 40 of which is pivoted as at 42 to ears on the boom in advance of the aforementioned ears. Actuation of the piston rod 40 will raise and lower the boom in a generally vertical plane. The means to actuate the piston rods is conventional and well known in the art.

Mounted vertically in the pipe section 22 is a spindle 44 whose upper end is provided with a bevel gear 46 which meshes with a bevel gear 48 at the free end of the conveyor so that the spindle and conveyor are driven in unison. The spindle is mounted by means of appropriate thrust bearings 50 and the bevel gears are enclosed in the fitting 20. The spindle bearings 50 and the conveyor bearing 14 act as seals so that fluid to be sprayed cannot enter the fitting 20 and the pipe section 22.

A disk 52 is provided having an upstanding peripheral flange 54, the disk being centrally mounted upon the lower end of the spindle 44. In the normal or at rest position, the disk bears against and closes the fluid outlet opening 24. A means is provided which serves the dual function of drivingly connecting the disk to the spindle and of controlling the deposition of fluid upon the disk. This means is a compound force transmitting means which is operatively connected to the disk and the spindle 44 whereby upon actuation of the motor 16 to rotate the spindle, the disk will initially move away from the fluid outlet opening and then rotate, and when the motor is discontinued the disk will move back to its normal position closing the fluid outlet opening. This means constitutes a substantially cylindrical hub member 56 which has a substantially helical groove 58 therein extending from a point adjacent the upper end to a point adjacent the lower end of the hub member. At said points the groove opens through opposed sides of the hub member, the openings extending for a short distance parallel to the plane of the disk as at 60 and 62. The hub member also has an axial bore 63 through which the spindle passes and a pin 64 extending outwardly from the spindle substantially at a right angle to its axis which is engaged in said groove 58.

Thus when the spindle is positively driven, the hub member 56 first rides down the spindle and then the pin 64 engages in the upper parallel portion 60 effecting a drive connection with the disk. In so doing the disk moves away from the fluid outlet opening 24 permitting fluid to impinge on the disk and to be spun in a 360° arc from the rotating disk. Because the fluid is mechanically carried to the disk and the latter spins the fluid therefrom virtually no shearing action or mechanical working is imparted to the fluid so that the viscosity characteristics of the fluid are not changed and, if the fluid is an emulsion, it will not invert.

When the drive means to the spindle is discontinued, inertia will cause the hub member to ride up the spindle and the pin 64 to engage in the lower parallel portion 62 whereby the disk will be urged against the fluid outlet opening 24. Thus the hub and pin construction effecting a connection of the disk to the spindle cooperates with the disk to provide a valve which automatically shuts off the supply of fluid to the disk when the latter is not positively driven.

Different types of disks may be employed in addition to the disk 52 with the peripheral flange 54. Several such disks are illustrated by way of example only, in Figs. 5–7. In Fig. 5 the disk 66 is flat, circular and without a flange. In Fig. 6, the fluid receiving surface 68 thereof is inwardly dished or substantially concave. In Fig. 7, the fluid receiving surface 70 is outwardly dished or substantially convex. In each case the disk is centrally apertured to receive the spindle and the hub member 56 is secured thereto.

In the embodiment herein shown, the fluid is fed through the outlet 24 upon the disk at an angle of substantially 90° to the plane of the disk thereby assuring an even distribution of spray over a 360° pattern. Specific directional sprays may be obtained by feeding the fluid to the disk at angles greater or less than 90° to the plane of the disk.

It is within the purview of the invention that the relationship between the speeds of the conveyor and disk and the sizes of the disk boom, conveyor and spindle can be varied since they will effect the nature of the distribution of the spray and its particle size. It has been found that the use of a spindle speed of 800 to 1000 r.p.m. and feeding an emulsion ranging in viscosity from very thin to very thick upon a flanged disk of 9 inch diameter results in a spray output of 3 to 5 gals./min. over a 360° pattern having a distribution of 15 to 18 feet in diameter. On the one hand, reduction of the conveyor and spindle speeds to 500 to 800 r.p.m. results in a reduced output of spray consisting of larger particle sizes distributed over a smaller distribution area. On the other hand, increasing the conveyor and spindle speeds to 1000 to 1300 r.p.m. increases the spray output consisting of smaller particle sizes distributed over a wider area. All other variables remaining constant, variations in the disk size will affect the particle size of the spray.

Thus it will be seen that the present spray apparatus can readily be adapted to vary the rate, area of distribution and particle size of the spray, as desired, without causing the viscosity characteristics of the spray emulsion to alter and without causing the emulsion to invert.

While a preferred embodiment of the invention has been shown and described herein, it is understood that a skilled artisan may make variations without departing from the spirit of the invention and the scope of the appended claims. Thus, any power means other than the internal combustion engine 16 may be employed to drive the conveyor. Means other than the bracket 28 and the hydraulic mechanism shown may also be used to mount the device on a vehicle and to vary the position of the boom. Although the screw conveyor is preferred, other conveyors of the mechanical type may be used to convey fluid to the disk without imparting shearing action thereto.

I claim:

1. Apparatus for spraying fluids comprising an elongated mechanical conveyor having a fluid receiving end and a fluid discharge end, a disk normally positioned against and closing said discharge end, drive means to rotate said disk and compound force transmitting means operatively connected to said disk and said drive means whereby upon actuation of said drive means, said disk is initially moved away from said discharge end and then rotated and when said drive means is discontinued said disk moves by inertia back to its normal discharge end closing position.

2. The combination of claim 1 wherein said drive means is also operatively connected to said conveyor to drive the latter and to rotate said disk in unison.

3. The combination of claim 1 wherein said drive means includes a rotatable spindle passing through said discharge end and said disk, and said compound force transmitting means includes a hub secured to said disk having a helical groove provided therein and a pin extending outwardly from said spindle and into the groove provided in said hub.

4. Apparatus for spraying fluids comprising an elongated hollow boom having a fluid receiving end, a screw conveyor extending through said boom, drive means operatively connected to said screw conveyor, a branch conduit connected at an angle to said boom adjacent its other end, a disk normally positioned against and closing the free end of said branch conduit, a spindle passing through the free end of said branch conduit and through said disk, gear means interconnecting said spindle and said screw conveyor and compound force transmitting means operatively connected to said disk and said spindle whereby upon actuation of said drive means, said disk is initially moved away from the free end of said branch conduit and then rotated, and when said drive means is discontinued said disk moves by inertia back to its position against the free end of said branch conduit.

5. The combination of claim 4 wherein said compound force transmitting means includes a hub secured to said disk having a helical groove provided therein and a pin extending outwardly from said spindle and into the groove provided in said hub.

References Cited in the file of this patent

UNITED STATES PATENTS

| | | |
|---|---|---|
| 1,155,576 | Isley | Oct. 5, 1915 |
| 1,197,744 | Kennington | Sept. 12, 1916 |
| 2,257,807 | Morse | Oct. 7, 1941 |
| 2,673,090 | Blumberg | Mar. 23, 1954 |

FOREIGN PATENTS

| | | |
|---|---|---|
| 656,599 | France | Jan. 2, 1929 |
| 141,689 | Australia | June 19, 1951 |